United States Patent
Moon et al.

(10) Patent No.: US 11,264,681 B2
(45) Date of Patent: Mar. 1, 2022

(54) ELECTRODE ASSEMBLY AND SECONDARY BATTERY USING THE SAME

(71) Applicant: Samsung SDI Co., Ltd., Yongin-si (KR)

(72) Inventors: Sehwan Moon, Yongin-si (KR); Sangeun Cheon, Yongin-si (KR); Sangwoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 393 days.

(21) Appl. No.: 15/368,424

(22) Filed: Dec. 2, 2016

(65) Prior Publication Data

US 2017/0179461 A1    Jun. 22, 2017

(30) Foreign Application Priority Data

Dec. 22, 2015 (KR) .......... 10-2015-0184030

(51) Int. Cl.
    *H01M 4/134*      (2010.01)
    *H01M 50/572*      (2021.01)
    (Continued)

(52) U.S. Cl.
     CPC ......... *H01M 50/572* (2021.01); *H01M 4/661* (2013.01); *H01M 4/664* (2013.01);
    (Continued)

(58) Field of Classification Search
     CPC ...... H01M 2/34; H01M 2/1241; H01M 4/664; H01M 4/661; H01M 4/134; H01M 4/13;
    (Continued)

(56) References Cited

U.S. PATENT DOCUMENTS

| | | | |
|---|---|---|---|
| 7,740,667 B2 * | 6/2010 | Kim ...................... | B26D 1/385 |
| | | | 29/623.1 |
| 2001/0012588 A1 * | 8/2001 | Kaido .................... | H01M 4/04 |
| | | | 429/233 |

(Continued)

FOREIGN PATENT DOCUMENTS

| | | |
|---|---|---|
| EP | 2048734 A1 | 4/2009 |
| EP | 2546905 A1 | 1/2013 |

(Continued)

OTHER PUBLICATIONS

Extended European Search Report dated Mar. 16, 2017 of the corresponding European Patent Application No. 16205869.7, noting listed reference in this IDS (8 pages).

*Primary Examiner* — Brian R Ohara
(74) *Attorney, Agent, or Firm* — Lewis Roca Rothgerber Christie LLP

(57) ABSTRACT

An electrode assembly includes a first electrode plate having a first electrode active material layer and a first electrode uncoated portion, a second electrode plate having a second electrode active material layer and a second electrode uncoated portion, and a separator between the first electrode plate and the second electrode plate, and a case accommodating the electrode assembly, where a ceramic layer having a smaller thickness than the first electrode active material layer is on the first electrode uncoated portion.

6 Claims, 4 Drawing Sheets

(51) Int. Cl.
  *H01M 50/342*   (2021.01)
  *H01M 4/66*   (2006.01)
  *H01M 10/04*   (2006.01)
  *H01M 10/0587*   (2010.01)
(52) U.S. Cl.
  CPC ....... *H01M 4/667* (2013.01); *H01M 10/0431* (2013.01); *H01M 10/0587* (2013.01); *H01M 50/3425* (2021.01); *H01M 4/134* (2013.01); *H01M 2200/20* (2013.01)
(58) Field of Classification Search
  CPC ...... H01M 4/136; H01M 4/583; H01M 4/133; H01M 4/5825; H01M 4/587; H01M 10/0587; H01M 10/0431; H01M 10/0525; H01M 2200/20; H01M 2004/021; H01M 2010/4292
  USPC ................ 429/231.95, 231.8, 224, 221, 223
  See application file for complete search history.

(56) References Cited

U.S. PATENT DOCUMENTS

| | | |
|---|---|---|
| 2002/0192558 A1 | 12/2002 | Miller et al. |
| 2005/0233219 A1* | 10/2005 | Gozdz ..................... H01M 4/13 429/231.95 |
| 2006/0093922 A1* | 5/2006 | Kim ..................... H01M 2/0275 429/251 |
| 2008/0292966 A1 | 11/2008 | Bak et al. |
| 2008/0299450 A1* | 12/2008 | Lim ........................ H01M 4/13 429/129 |
| 2009/0092898 A1 | 4/2009 | Han |
| 2009/0208826 A1* | 8/2009 | Lee ........................ H01M 4/62 429/94 |
| 2010/0310924 A1* | 12/2010 | Kaneda ............. H01M 10/0431 429/163 |
| 2011/0151295 A1 | 6/2011 | Kim |
| 2013/0017424 A1 | 1/2013 | Anh |
| 2014/0120395 A1 | 5/2014 | Ziegler |
| 2014/0215810 A1* | 8/2014 | Kim .................. H01M 10/0587 29/623.5 |

FOREIGN PATENT DOCUMENTS

| | | |
|---|---|---|
| KR | 2000-0051739 | 8/2000 |
| KR | 10-2008-0037867 A | 5/2008 |
| KR | 10-2011-0069368 | 6/2011 |
| KR | 10-2014-0070260 A | 6/2014 |

* cited by examiner

ELECTRODE ASSEMBLY AND SECONDARY BATTERY USING THE SAME

CROSS-REFERENCE TO RELATED APPLICATION

This application claims priority to and the benefit of Korean Patent Application No. 10-2015-0184030 filed on Dec. 22, 2015 in the Korean Intellectual Property Office, the entire contents of which are incorporated herein by reference.

BACKGROUND

1. Field

Embodiments of the present disclosure relate to an electrode assembly and a secondary battery using the same.

2. Description of the Related Art

Unlike a primary battery, a rechargeable secondary battery is designed to be repeatedly charged and discharged. Small-capacity secondary batteries having a single battery cell packaged in the form of a pack are used in portable small-sized electronic devices, such as cellular phones or camcorders, and large-capacity secondary batteries having several tens of battery cells coupled or connected to one another and packaged in the form of a pack are used as power sources for driving motors of hybrid vehicles or the like.

The secondary battery may be manufactured by accommodating an electrode assembly including a positive electrode, a negative electrode, and a separator interposed therebetween and an electrolyte solution in a case and installing a cap plate in the case. Representative examples of the electrode assembly may include a jelly-roll type (or kind) of electrode assembly. Since the jelly-roll type (or kind) of electrode assembly is subjected to severe stress at its round portions, where the positive electrode and the negative electrode are curved to then be wound, it may be prone to deformation.

SUMMARY

Embodiments of the present disclosure provide an electrode assembly and a secondary battery using the same, which can improve safety of the secondary battery by preventing or reducing deformation of the electrode assembly during swelling, and can improve a long-term life characteristic of the secondary battery through a uniform (e.g., substantially uniform) interfacial reaction.

The above and other aspects of embodiments of the present disclosure will be described in or be apparent from the following description of exemplary embodiments.

According to an aspect of an embodiment of the present disclosure, there is provided an electrode assembly including a first electrode plate having a first electrode active material layer and a first electrode uncoated portion, a second electrode plate having a second electrode active material layer and a second electrode uncoated portion, and a separator between the first electrode plate and the second electrode plate, and a case accommodating the electrode assembly, where a ceramic layer having a smaller thickness than the first electrode active material layer is on the first electrode uncoated portion.

The ceramic layer is formed to extend from the first electrode uncoated portion to a portion of the first electrode active material layer.

The first electrode active material layer may include a high coating portion having a relatively large height at a coating start portion of the first electrode active material layer, and a low coating portion having a relatively small height at a coating end portion of the first electrode active material layer, and the ceramic layer may cover the high coating portion and the low coating portion.

The electrode assembly may include planar portions, where the first electrode plate and the second electrode plate are planarly wound, and round portions, where the first electrode plate and the second electrode plate are curved to then be wound, the first electrode plate has a plurality of the first electrode active material layers and a plurality of the first electrode uncoated portions alternately positioned, and the first electrode uncoated portions may be positioned on the round portions.

In the first electrode plate, the first electrode active material layers may have an equal length, and the first electrode uncoated portions may have gradually increasing lengths from a winding start portion to a winding end portion.

In the first electrode plate, the first electrode uncoated portions may have an equal length, and the first electrode active material layers may have gradually increasing lengths from a winding start portion to a winding end portion.

The ceramic layer may be selected from the group consisting of $BaTiO_3$, $Pb(Zr,Ti)O_3$ (PZT), $Pb_{1-x}La_xZr_{1-y}Ti_yO_3$ (PLZT), where $0<x<1$ and $0<y<1$, $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures of two or more of these materials.

The ceramic layer may have a thickness in a range of 3 μm to 5 μm.

According to an aspect of an embodiment of the present disclosure, there is provided an electrode assembly including a first electrode plate having a first electrode active material layer and a first electrode uncoated portion, a second electrode plate having a second electrode active material layer and a second electrode uncoated portion, and a separator between the first electrode plate and the second electrode plate, wherein a ceramic layer having a smaller thickness than the first electrode active material layer is on the first electrode uncoated portion.

The first electrode plate may have a plurality of the first electrode active material layers and a plurality of the first electrode uncoated portions alternately positioned, the first electrode uncoated portions may be positioned on round portions of the electrode assembly, where the first electrode plate and the second electrode plate are curved to then be wound, and the ceramic layer is formed to extend from the first electrode uncoated portion to a portion of the first electrode active material layer.

As described above, in the secondary battery according to an embodiment of the present disclosure, an electrode uncoated portion is positioned at a round portion of the electrode assembly to reduce stress of the round portion during swelling, thereby preventing or reducing deformation of the electrode assembly. Accordingly, the safety and life characteristic of the secondary battery can be improved through a uniform (e.g., substantially uniform) interfacial reaction.

In addition, in the secondary battery according to an embodiment of the present disclosure, a ceramic layer is formed at an electrode uncoated portion, thereby reinforcing a mechanical strength of the electrode uncoated portion.

BRIEF DESCRIPTION OF THE DRAWINGS

The above and other features of the subject matter of the present disclosure will become more apparent by describing in detail exemplary embodiments thereof with reference to the attached drawings in which.

DETAILED DESCRIPTION

Figure 1:
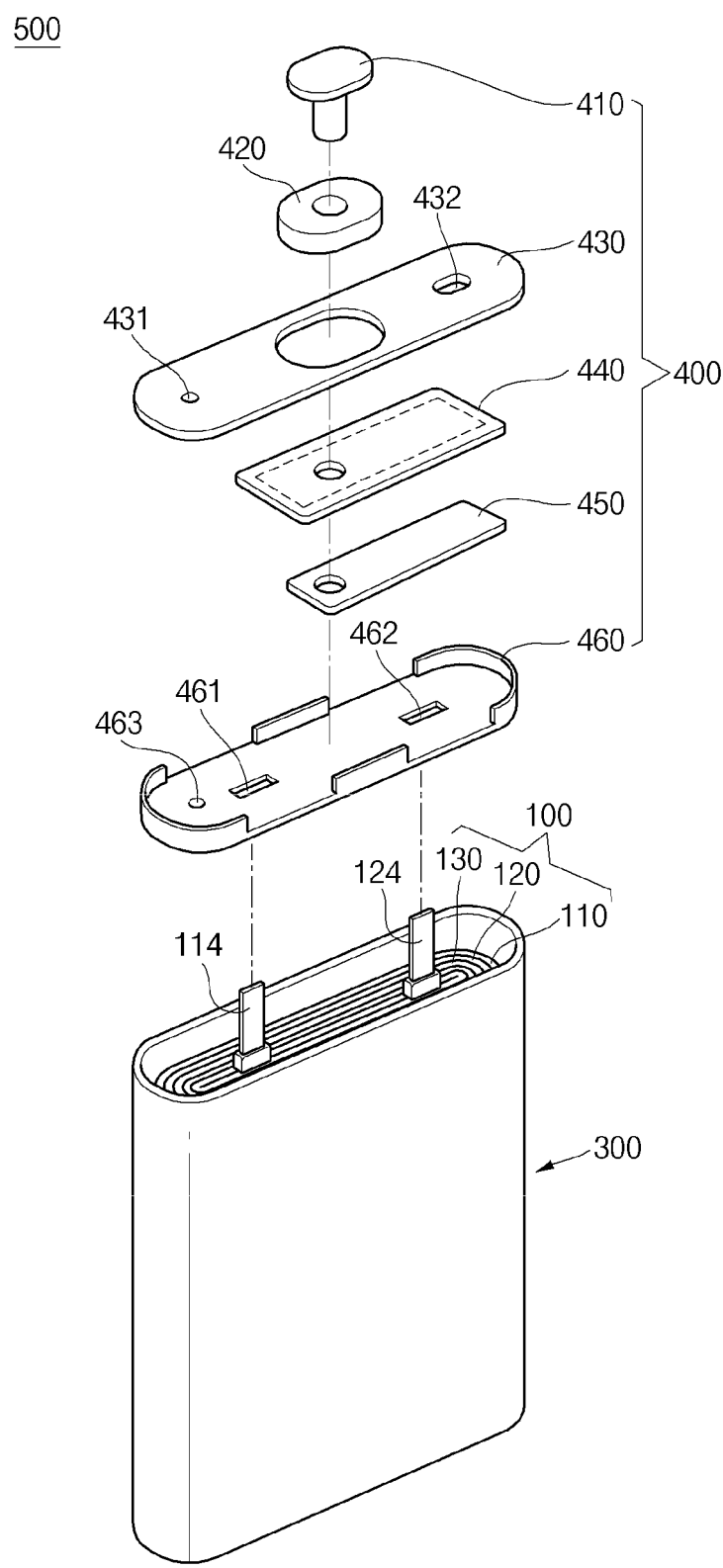
FIG. 1 is an exploded perspective view illustrating a secondary battery according to an embodiment of the present disclosure.

Hereinafter, examples of embodiments of the disclosure will be described in more detail with reference to the accompanying drawings such that they can easily be made and used by those skilled in the art.

The subject matter of the present disclosure may, however, be embodied in many different forms and should not be construed as being limited to the embodiments set forth herein. Rather, these embodiments are provided so that this disclosure will be thorough and complete and will fully convey the concepts of the disclosure to those skilled in the art, and the subject matter of the present disclosure will only be defined by the appended claims, and equivalents thereof.

In the drawings, the thickness of layers and regions may be exaggerated for clarity. Like numbers refer to like elements throughout. As used herein, the term "and/or" includes any and all combinations of one or more of the associated listed items. In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, acts, operations, elements, components, and/or groups thereof.

Figure 2:
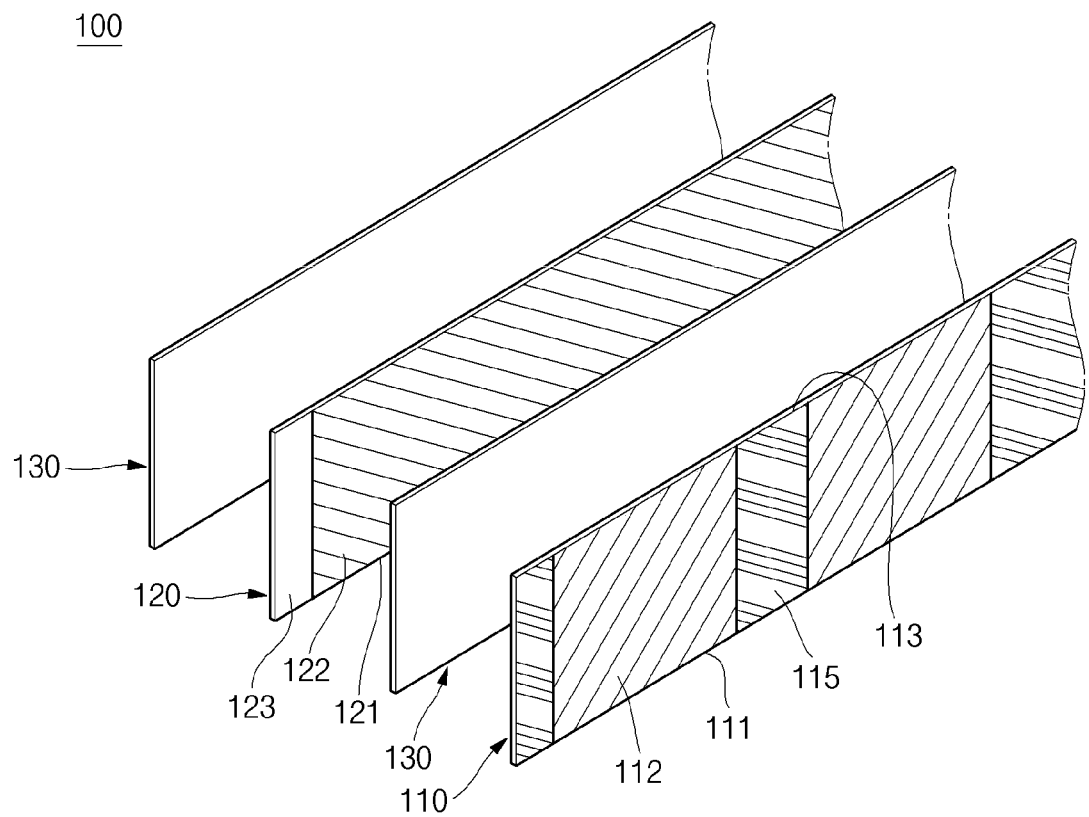
FIG. 2 is a perspective view illustrating a state in which an electrode assembly of FIG. 1 is yet to be wound.
Figure 3:
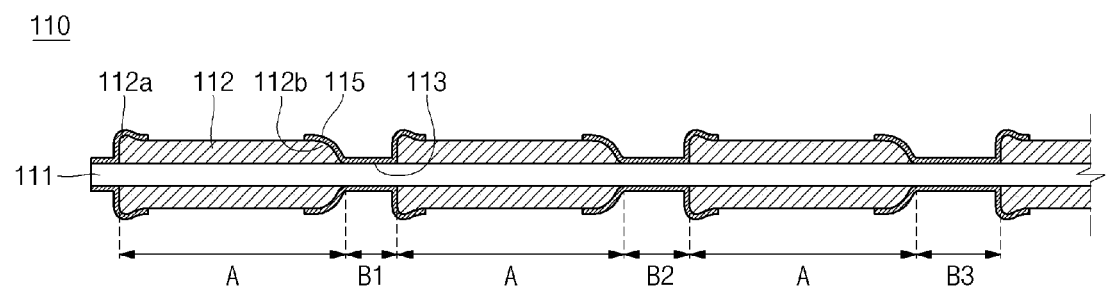
FIG. 3 is a cross-sectional view illustrating a first electrode plate of FIG. 2.
Figure 4:
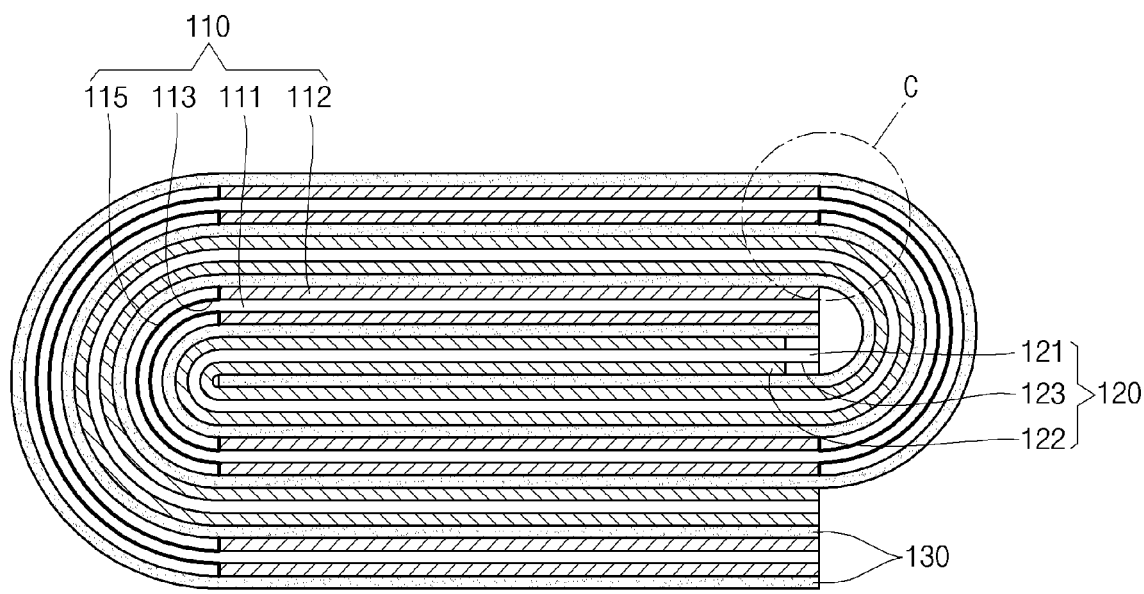
FIG. 4 is a cross-sectional view illustrating an electrode assembly of FIG. 1.
Figure 5:
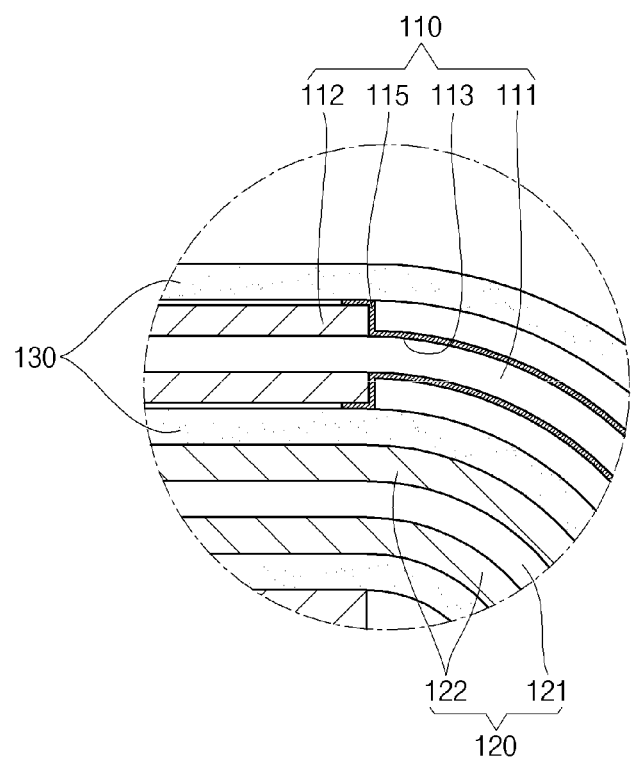
FIG. 5 is an enlarged view illustrating a portion "C" of FIG. 4.
Figure 6:
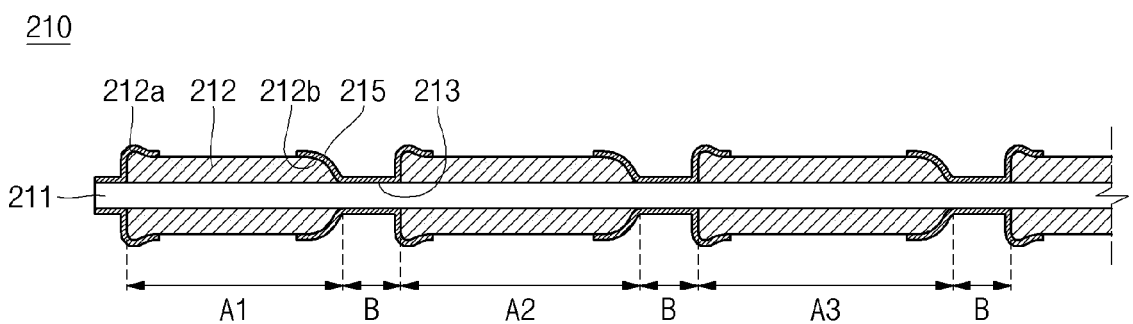
FIG. 6 is a cross-sectional view illustrating a first electrode plate according to an embodiment of the present disclosure.
Figure 7:
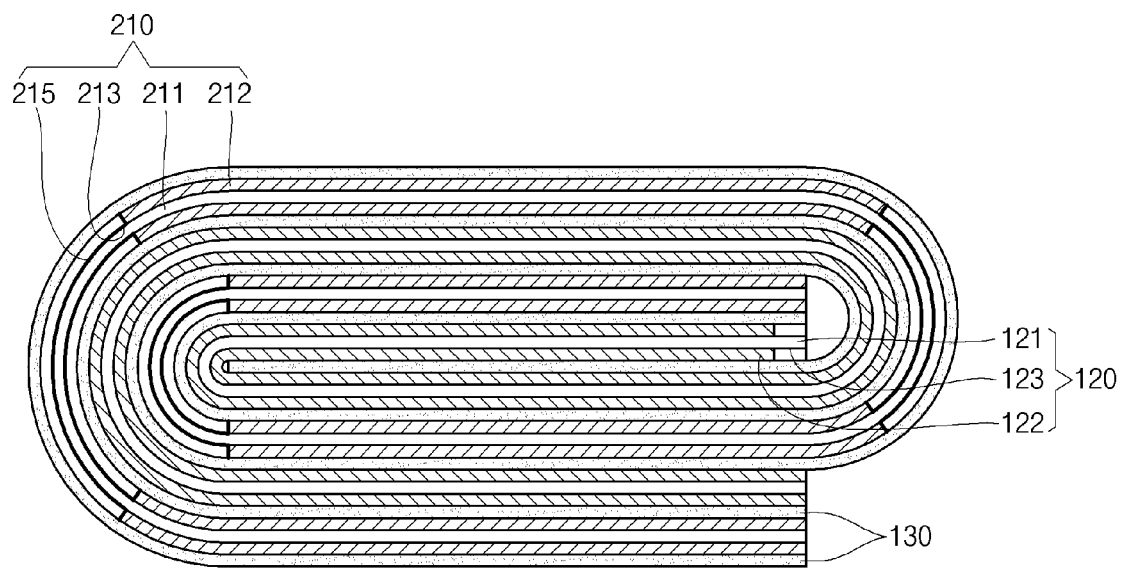
FIG. 7 is a cross-sectional view illustrating an electrode assembly wound using a first electrode plate of FIG. 6.

Embodiments of the present disclosure provide an electrode assembly, which can improve safety by preventing or reducing deformation of the electrode assembly during swelling, and can improve a life characteristic, and a secondary battery using the same. FIG. 1 is an exploded perspective view illustrating a secondary battery according to an embodiment of the present disclosure, FIG. 2 is a perspective view illustrating a state in which an electrode assembly of FIG. 1 is yet to be wound (e.g., FIG. 2 is an exploded perspective view of an electrode assembly prior to winding), FIG. 3 is a cross-sectional view illustrating a first electrode plate of FIG. 2, FIG. 4 is a cross-sectional view illustrating an electrode assembly of FIG. 1 (e.g., an electrode assembly after winding), FIG. 5 is an enlarged view illustrating a portion "C" of FIG. 4, FIG. 6 is a cross-sectional view illustrating a first electrode plate according to an embodiment of the present disclosure, and FIG. 7 FIG. 6 is a cross-sectional view illustrating an electrode assembly wound using a first electrode plate of FIG. 6.

Referring to FIGS. 1 to 5, the secondary battery 500 according to an embodiment of the present disclosure includes an electrode assembly 100, a case 300 and a cap assembly 400.

The electrode assembly 100 includes a first electrode plate 110, a second electrode plate 120 and a separator 130 interposed between the first electrode plate 110 and the second electrode plate 120. The electrode assembly 100 is formed such that a stacked structure of the first electrode plate 110, the second electrode plate 120 and the separator 130 is wound in a jelly-roll configuration. The electrode assembly 100 includes planar portions in which the first electrode plate 110, the second electrode plate 120 and the separator 130 are planarly wound, and round portions in which the first electrode plate 110, the second electrode plate 120 and the separator 130 are curved to then be wound. For example, in at least one of the planar portions, the first electrode plate 110, the second electrode plate 120 and the separator 130 each extend along a respective plane that is substantially parallel to the other planes.

The first electrode plate 110 includes a first electrode current collector 111 made of a metal foil, such as aluminum, a first electrode active material layer 112 formed on both surfaces of the first electrode current collector 111 and coated with a first electrode active material, and a first electrode uncoated portion 113 that is not coated with the first electrode active material. In addition, the first electrode plate 110 includes a first current collecting tab 114 formed on the first electrode uncoated portion 113 and a ceramic layer 115. The first electrode active material may include a metal oxide including, for example, a lithium containing transition metal oxide, such as $LiCoO_2$, $LiNiO_2$, $LiMnO_2$, $LiMn_2O_4$ and/or $LiNi_{1-x-y}Co_xM_yO_2$, where $0 \le x \le 1$, $0 \le y \le 1$, $0 \le x+y \le 1$, and M is a metal, such as Al, Sr, Mg, La, etc., or a lithium chalcogenide compound. For example, the first electrode plate 110 may be a positive electrode plate.

In addition, the first electrode active material is intermittently coated on the first electrode current collector 111. For example, the first electrode active material may be coated on portions of the first electrode current collector 111 and other portions of the first electrode current collector 111 may be free or substantially free of the first electrode active material, and the portions and the other portions may be alternately arranged. Therefore, the first electrode active material layer 112 and the first electrode uncoated portion 113 are alternately formed on the first electrode current collector 111. Here, the first electrode active material layer 112 and the first electrode uncoated portion 113 are plurally provided, respectively. The first electrode uncoated portions 113 are positioned on (e.g., located at) the round portions of the electrode assembly 100. In addition, the first electrode active material layers 112 are coated on the first electrode current collector 111 to have an equal (e.g., substantially equal) length, and the first electrode uncoated portions 113 are formed to have gradually (e.g., incrementally) increasing lengths from a winding start portion to a winding end portion. Since the electrode assembly 100 has gradually increasing thickness as the winding of the first electrode plate 110, the first electrode uncoated portions 113 should have gradually increasing lengths from the winding start portion to the winding end portion to allow the first electrode uncoated portions 113 to be positioned on (e.g., located at) round portions of the electrode assembly 100. For example, assuming that a first length B1 refers to a length of the first electrode uncoated portion 113 formed at the winding start portion, a second length B2 refers to a length of the first electrode uncoated portion 113 formed between the preceding and current first electrode active material layers 112 (identified as "A" in FIG. 3), and a third length B3 refers to a length of the first electrode uncoated portion 113 formed between the current and following first electrode active material layers 112, the second length B2 is greater than the first length B1 and the third length B3 is greater than the second length B2 (B1<B2<B3). As described above, if the first electrode uncoated portions 113 are positioned on (e.g., located at) the round portions, the thicknesses of the round portions are reduced. Accordingly, during swelling of the electrode assembly 100, the stress applied to the round portion is reduced to prevent or reduce deformation of the electrode assembly 100, thereby improving the safety and life characteristic of the secondary battery 500 according to an embodiment of the present disclosure.

In addition, referring to FIG. 3, since the first electrode active material layer 112 is intermittently coated on the first electrode current collector 111, a larger amount of the first electrode active material is coated on the coating start portion than other portions, leading to a "loading soaring" phenomenon in which the coated first electrode active material is soared upwards (e.g., the first electrode active material layer 112 is thicker at the coating starting portion than at other portions). Additionally, a "coating dragging" phenomenon may occur to the coating end portion of the first electrode active material layer 112 where a smaller amount of the first electrode active material is coated on the coating end portion than other portions (e.g., first electrode active material layer 112 is tapered and/or is thinner at the coating end portion than at other portions). Here, a portion of the first electrode active material layer 112, where the loading soaring phenomenon occurs and a relatively large amount of an active material is coated, will be defined as a high coating portion 112a, and a portion of the first electrode active material layer 112, where the coating dragging phenomenon occurs and a relatively small amount of the active material is coated, will be defined as a low coating portion 112b. The first current collecting tab 114 is formed on the first electrode uncoated portion 113. For example, the first current collecting tab 114 may be formed on one of the first electrode uncoated portions 113. In addition, the first current collecting tab 114 is formed to protrude to an upper portion of the electrode assembly 100.

The ceramic layer 115 is formed on the first electrode uncoated portion 113 to cover the first electrode uncoated portion 113. In addition, the ceramic layer 115 is formed to extend from the first electrode uncoated portion 113 to a portion of the first electrode active material layer 112. For example, in some embodiments, the ceramic layer 115 is formed on the first electrode uncoated portion 113, the low coating portion 112b of the first electrode active material layer 112, positioned at (e.g., located at) one side of the first electrode uncoated portion 113, and the high coating portion 112a of the first electrode active material layer 112, positioned at (e.g., located at) the other side of the first electrode uncoated portion 113.

The ceramic layer 115 is formed on the high coating portion 112a protruding from the first electrode active material layer 112. Thus, the ceramic layer 115 can prevent an electric short between the first electrode plate 110 and the second electrode plate 120 from occurring in an event where the separator 130 is torn by the high coating portion 112a (or the ceramic layer 115 can reduce a likelihood or extent of such an electric short). In addition, the ceramic layer 115 is formed on the low coating portion 112b of the first electrode active material layer 112, where a relatively small amount of active material is coated (e.g., less of the active material is coated at the low coating 112b than at the high coating portion 112a), thereby reducing a deviation in the thickness of the first electrode active material coated on the first electrode active material layer 112. Further, the ceramic layer 115 is formed on the first electrode uncoated portion 113, thereby reinforcing the mechanical strength of the first electrode uncoated portion 113.

In addition, the ceramic layer 115 is formed by coating a ceramic material on the first electrode uncoated portion 113 and a portion of the first electrode active material layer 112. The ceramic layer 115 may be selected from the group consisting of $BaTiO_3$, $Pb(Zr,Ti)O_3$ (PZT), $Pb_{1-x}La_xZr_{1-y}Ti_yO_3$ (PLZT), where $0<x<1$ and $0<y<1$, $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures of two or more of these materials. The ceramic layer 115 is formed to have a smaller (e.g., substantially smaller or much smaller thickness) than that of the first electrode active material layer 112. In more detail, if the first electrode active material layer 112 has a thickness of approximately 120 μm to approximately 150 μm, the ceramic layer 115 may be formed to have a thickness in a range of approximately 3 μm to approximately 5 μm. Here, if the thickness of the ceramic layer 115 is smaller than 3 μm, the ceramic layer 115 is too thin to be formed on the first electrode uncoated portion 113. However, if the thickness of the ceramic layer 115 is larger than 5 μm, the ceramic layer 115 does not suitably reduce the stress applied to the round portion, making it quite difficult to wind the first electrode plate 110. In addition, since the ceramic layer 115 is formed on the first electrode uncoated portion 113, it may have gradually increasing lengths from a winding start portion to a winding end portion, like the first electrode uncoated portion 113.

As illustrated in FIG. 6, a first electrode plate 210 according to an embodiment of the present disclosure may be configured such that a first electrode active material layer 212 has different lengths. For example, in some embodiments, a first electrode active material is intermittently coated on the first electrode current collector 211, and the first electrode active material layers 212 have gradually (e.g., incrementally) increasing lengths from a winding start portion to a winding end portion. Here, the first electrode uncoated portions 213 are formed to have an equal (e.g., substantially equal) length. For example, assuming that a first length A1 refers to a length of the first electrode active material layer 212 formed at a winding start portion, a second length A2 refers to a length of the first electrode active material layer 212 formed between the preceding and the current first electrode uncoated portion 213 (identified as "B" in FIG. 3), and a third length A3 refers to a length of the first electrode active material layer 212 formed between the current and following first electrode uncoated portion 213, the second length A2 is larger than the first length A1 and the third length A3 is larger than the second length A2 (A1<A2<A3). Accordingly, as illustrated in FIG. 7, the first electrode uncoated portions 213 are positioned on (e.g., located at) round portions. In addition, the first electrode active material layers 212 may be positioned on (e.g., located at) planar portions and portions of the first electrode active material layers 212 may extend over the planar portions up to the round portions.

In addition, the first electrode active material layer 212 includes a high coating portion 212a, where a relatively larger amount of an active material is coated to then protrude upwardly at the coating start portion than at other portions, and a low coating portion 212b, where a coating dragging phenomenon occurs and a smaller amount of the active material is coated on the coating end portion than at other portions. Further, a ceramic layer 215 is formed on the first electrode uncoated portion 213 and formed to extend to the first electrode active material layer 212 to cover the high coating portion 212a and the low coating portion 212b of the first electrode active material layer 212. In addition, since the ceramic layer 215 is formed on the first electrode uncoated portion 213, it is formed to have an equal (e.g., substantially equal) length throughout the first electrode current collector 211.

The second electrode plate 120 includes a second electrode current collector 121 made of a metal foil, such as a copper or nickel foil, a second electrode active material layer 122 formed on both surfaces of the second electrode current collector 121 and coated with a second electrode active material, and a second electrode uncoated portion 123 that is not coated with the second electrode active material. The second electrode active material may include a carbonaceous material, such as crystalline carbon, amorphous carbon, a carbon compound and/or a carbon fiber, a lithium metal and/or a lithium alloy. For example, the second electrode plate 120 may be a negative electrode plate.

In addition, the second electrode active material layer 122 is formed by continuously (e.g., substantially continuously) coating the second electrode active material on both surfaces of the second electrode current collector 121. Therefore, the second electrode active material layer 122 is positioned on (e.g., located at) both of the planar portions and the round portions of the electrode assembly 100. The second electrode uncoated portion 123 may be formed at one end or both ends of the second electrode current collector 121, and a second current collecting tab 124 is formed on the second electrode uncoated portion 123. The second current collecting tab 124 is formed to protrude to an upper portion of the electrode assembly 100.

The separator 130 is positioned between (e.g., located between) the first electrode plate 110 and the second electrode plate 120 to prevent an electric short from occurring therebetween (or to reduce a likelihood or extent of such an electric short) and to allow lithium ions to move. The separator 130 may be made of polyethylene, polypropylene, and/or a copolymer of polyethylene and polypropylene.

The case 300 is made of a conductive metal, such as aluminum, an aluminum alloy or nickel plated steel, and may have an approximate hexahedron shape having an opening through which the electrode assembly 100 may be inserted and placed. The case 300 may have a polarity, e.g., a first (positive) electrode polarity.

The cap assembly 400 is positioned on (e.g., located on) the electrode assembly 100 and is coupled to the opening of the case 300 to seal the case 300. The cap assembly 400 includes an electrode terminal 410, a gasket 420, a cap plate 430, an insulation plate 440, a terminal plate 450 and an insulation case 460. The gasket 420 is inserted between the electrode terminal 410 and the cap plate 430. The electrode terminal 410 and the terminal plate 450 are electrically coupled or connected to each other. The insulation plate 440 insulates the cap plate 430 and the terminal plate 450 from each other. An electrolyte injection hole 431 is formed at one side of the cap plate 430. After an electrolyte solution is injected into the electrolyte injection hole 431, a plug is installed to seal the electrolyte injection hole 431. In addition, a safety vent 432 is formed at the other side of the cap plate 430. The safety vent 432 is formed more thinly (e.g., is thinner) than the cap plate 430. When the internal pressure of the case 300 exceeds a set (e.g., predetermined) operating pressure of the safety vent 432, the safety vent 432 is opened to then release internal gases. The insulation case 460 is formed in the opening of the case 300 and seals the case 300. The insulation case 460 is made of a polymer resin having an insulating property such as, for example, polypropylene (PP). Holes 461 and 462 are formed in the insulation case 460 to allow the first electrode tab 114 and the second electrode tab 124 to pass therethrough. In addition, an electrolyte passing hole 463 is formed at a location of the insulation case 460, corresponding to the electrolyte injection hole 431.

As described above, in the secondary battery 500 according to an embodiment of the present disclosure, the first electrode uncoated portion 113 is positioned on (e.g., located at) the round portion, thereby reducing the stress applied to the round portion during swelling of the electrode assembly 100 and preventing or reducing deformation of the electrode assembly 100. Accordingly, the safety and life characteristic of the secondary battery 500 according to an embodiment of the present disclosure can be improved.

In addition, in the secondary battery 500 according to an embodiment of the present disclosure, the mechanical strength of the first electrode uncoated portion 113 can be reinforced by forming the ceramic layer 115 in the first electrode uncoated portion 113.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. For example, the first electrode plate described herein could be termed a second electrode plate.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the electrode assembly and the secondary battery using the same according to the present disclosure has been particularly shown and described with reference to exemplary embodiments thereof, it will be understood by those of ordinary skill in the art that various changes in form and details may be made therein without departing from the spirit and scope of the present disclosure as defined by the following claims, and equivalents thereof.

What is claimed is:

1. A secondary battery comprising:
   an electrode assembly comprising a first electrode plate having a first electrode active material layer and a first electrode uncoated portion, a second electrode plate having a second electrode active material layer and a second electrode uncoated portion, and a separator between the first electrode plate and the second electrode plate; and
   a case accommodating the electrode assembly,
   wherein a ceramic layer having a smaller thickness than the first electrode active material layer is on the first electrode uncoated portion,
   wherein the ceramic layer covers only a portion of an upper surface of the first electrode active material layer,
   wherein the electrode assembly comprises planar portions, where the first electrode plate and the second electrode plate are planarly wound, and round portions, where the first electrode plate and the second electrode plate are curved to then be wound,
   wherein the first electrode plate has a plurality of the first electrode active material layers and a plurality of the first electrode uncoated portions alternately positioned on a same surface of the first electrode plate,
   wherein the first electrode uncoated portions are positioned on the round portions,
   wherein the second electrode active material layer is positioned on the round portions,
   wherein the first electrode active material layer comprises a high coating portion having a relatively large height at a coating start portion of the first electrode active material layer, and a low coating portion having a relatively small height at a coating end portion of the first electrode active material layer, and
   wherein the ceramic layer covers the high coating portion and the low coating portion.

2. The secondary battery of claim 1, wherein in the first electrode plate, the first electrode active material layers have an equal length, and the first electrode uncoated portions have gradually increasing lengths from a winding start portion to a winding end portion.

3. The secondary battery of claim 1, wherein in the first electrode plate, the first electrode uncoated portions have an equal length, and the first electrode active material layers have gradually increasing lengths from a winding start portion to a winding end portion.

4. The secondary battery of claim 1, wherein the ceramic layer is selected from the group consisting of $BaTiO_3$, $Pb(Zr,Ti)O_3$ (PZT), $Pb_{1-x}La_xZr_{1-y}Ti_yO_3$ (PLZT), where $0<x<1$ and $0<y<1$, $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures of two or more of these materials.

5. The secondary battery of claim 1, wherein the ceramic layer has a thickness in a range of 3 µm to 5 µm.

6. An electrode assembly comprising:
   a first electrode plate having a first electrode active material layer and a first electrode uncoated portion;
   a second electrode plate having a second electrode active material layer and a second electrode uncoated portion; and
   a separator between the first electrode plate and the second electrode plate,
   wherein a ceramic layer having a smaller thickness than the first electrode active material layer is on the first electrode uncoated portion,
   wherein the ceramic layer covers only a portion of an upper surface of the first electrode active material layer,
   wherein the first electrode plate has a plurality of the first electrode active material layers and a plurality of the first electrode uncoated portions alternately positioned on a same surface of the first electrode plate, the first electrode uncoated portions are positioned on round portions of the electrode assembly, where the first electrode plate and the second plate are curved to then be wound,
   wherein the second electrode active material layer is positioned on the round portions,
   wherein the first electrode active material layer comprises a high coating portion having a relatively large height at a coating start portion of the first electrode active material layer, and a low coating portion having a relatively small height at a coating end portion of the first electrode active material layer, and
   wherein the ceramic layer covers the high coating portion and the low coating portion.

* * * * *